Patented Jan. 8, 1935

1,986,907

UNITED STATES PATENT OFFICE 1,986,907

PRODUCTION OF NODULES

Sidney D. Wells, Port Edwards, Wis.

No Drawing. Application January 18, 1932, Serial No. 587,441

9 Claims. (Cl. 92—20)

My invention relates to a new fibrous product and to a method of producing said product.

An important object of my invention is to utilize waste paper such as newspaper and the like although my invention may be carried out with any paper stock or fibrous material. Where news print or other printed paper is used for remanufacture into paper it is necessary to remove the ink from the paper and this result is accomplished readily by my improved method of treatment.

Another object of my invention is to provide an absorbent material from paper stock or other fibrous material which may be used to absorb liquids or gases or to store explosive gases, liquids or the like, and through which gases or liquids may be freely passed.

Other objects and advantages of my invention will be apparent during the course of the following description.

Heretofore, in the treatment of newspaper or the like, mixing of the de-inking reagents with the waste paper was accomplished by using the customary types of beating equipment. Such equipment, however, is limited to stock consistencies of not over seven or eight per cent. I have discovered that in using the principle of beating with rods, as disclosed in my Patent No. 1,654,624 of January 3, 1928, it is possible to treat waste printed paper or the like with little more than twice its weight of water. Not only does this rod mill treatment require a relatively small amount of water but a rubbing action between the fibers is obtained which is impossible at the usual consistencies, which are below eight per cent, and the reagents are intimately mixed with the fibrous material. The concentration of the reagents to the water is much greater than is usually possible and satisfactory results are obtained with quantities of reagents up to eighty per cent less than has hitherto been required.

In the reclamation of hard sized or coated papers in which an insoluble adhesive such as casein has been used, temperatures higher than room temperature are usually required and steam is often used to raise the material to the desired temperature. In my process the disintegration of the stock is obtained with the use of a much smaller quantity of water than has heretofore been used, water as low as one twentieth of the amount formerly used having proved satisfactory, and the consumption of steam is therefore correspondingly reduced.

In the de-inking of material such as waste newspaper which contains ground wood often slack sized, the papers are fed directly to a rod mill with just enough water, containing relatively small amounts of reagents, to produce approximately the following proportions:

| | |
|---|---|
| Waste newspapers | 2000 pounds |
| Soda ash | 30 pounds |
| Bentonite | 50 pounds |
| Kerosene | 1 gallon |
| Water | 500 gallons |

This mixture is passed through a rod mill of any suitable construction, such as that shown and described in my prior patent referred to above. For example, an open ended discharge rod mill of the low pulp line type having an internal diameter of seven feet, an inside length of sixteen feet and requiring one hundred and eighty five horse-power at the rate of one hundred and twenty tons of waste paper per twenty four hours may be used successfully to treat the stock. This treatment will completely defiber the stock and will loosen the ink and other impurities to an extent allowing them to be removed from the stock by suitable washing devices such as sloping screen oscillating shower washers, multiple decker washers, or similar devices which do not necessarily depend on filtering for the removal of nonfibrous material.

Magazine, book and coated papers, free from ground wood pulp usually contain clay and consequently the quantity of bentonite may be reduced, and because of the presence of casein the proportion of soda ash should be increased. The following approximate proportions have been found to give good results in treating this type of material:

| | |
|---|---|
| Waste paper | 2000 pounds |
| Soda ash | 50 pounds |
| Bentonite | 20 pounds |
| Kerosene | 1 gallon |
| Water | 500 gallons |

The water used should have a temperature of about 140° F. Where superior results are desired, dichlorethylene, carbon tetrachloride or similar solvents may be substituted for the kerosene. Steam may be blown into the rod mill to heat the contents, if hot water cannot be obtained but usually the water can be heated more economically from the waste heat of condensers or at some other point in the system of paper treating equipment.

The stock is fed to the rod mill at unusually high consistencies and is resolved into pellets or nodules of fibers due to the rod mill treatment at consistencies which may range from twelve per cent to about thirty three per cent, although at this upper limit the results are not as good as they are at thirty per cent or not less than twelve per cent. The nodulized stock obtained from this treatment is filled with voids which permit the passage of water or gas. Washing of the stock is greatly facilitated when the stock has been nodulized and insoluble substances such as ink may be mechanically washed therefrom in a device such as a sloping screen washer.

In addition to facilitating the de-inking and purifying of newsprint and other waste paper, my process of nodulizing stock may be applied to paper and fibrous material of all kinds.

The nodulized stock may be used in a wet or damp condition as a material for absorbing suitable gases and liquids. Water soluble gases such as sulphur dioxide may be readily absorbed by nodulized fibrous material, and sulphur gases may be removed from mixtures with inert and insoluble gases such as nitrogen. This material is therefore very useful in the removal of sulphur dioxide from the flue gases of smelters, an operation which is required for public health and conservation of vegetable life. Nodulized paper stock is an excellent absorbing material easily handled and low in price, especially when made from newsprint or waste paper. The sulphur dioxide absorbed by the nodulized stock can be leached from the nodules and used for the manufacture of sulphuric acid, or calcium bisulphite for the manufacture of paper pulp, or it can be dried, compressed and shipped as liquid sulphur dioxide to chemical manufacturers, textile bleachers or other users. The nodules, after leaching may be washed, run into a sheet and renodulized by means of the rod mill, or by draining may be used several times before renodulizing is necessary.

The nodulized stock may be used either wet or dry and in either form will permit the passage of liquids or gases therethrough. In contrast to the nodulized stock, pulp in sheet form packs in dense masses when wet and if thoroughly pulped at low or usual consistencies the mass is fluid and the fibers flow or pack into dense masses when fluids are passed therethrough. In the case of the passage of gases through such stock the resistance to the gas is as great as though the stock were all water due to the fact that the stock is substantially a suspension of fibers in water.

The nodules formed by my treatment at high consistencies in a rod mill are substantially one sixteenth to one eighth of an inch diameter. These nodules can be charged into tanks or chambers and liquids or gases will pass through with very little drop in pressure. A Freeness of from 600 to 700 is obtained with nodulized catalogue paper while in perfect suspension the same stock has a Freeness of only 140.

My method of treatment may be used for converting paper stock into suitable form for packing cylinders for holding explosive gases, after drying, or the nodules can be impregnated with chemicals to serve as a vehicle therefor, or to absorb substances not absorbed by the fibers alone or the water soaked fiber.

An advantage of using paper stock in this form is that after it has absorbed all of the fluid which it will hold, the fluid can be washed therefrom in paper and pulp making equipment and the stock renodulized and used again. Waste paper stock is the cheapest form of stock and with my process it may be readily used because of the facility with which the impurities may be washed from the nodules. Other types of material may be used if desired.

It will be seen therefore that I have provided a method of treating stock so that the washing or purification of the same is facilitated by the more ready passage of fluids, either liquid or gaseous, therethrough. It will also be seen that I have provided a method of converting paper stock into an useful absorbent material or a vehicle for absorbents or reagents, or a packing material for converting large spaces into a multiplicity of small or minute spaces. The easy handling of the nodulized material with standard pulp and paper making equipment for the removal of the material absorbed, and for the reuse of the stock, improves the value of my product and decreases its cost.

The ingredients named, and their proportions, are given as examples only and may be varied to suit varying conditions and different types of stock.

While I have described the preferred embodiment of my invention it is to be understood that various changes in the steps of my method may be resorted to without departing from the spirit of my invention or the scope of the subjoined claims.

Having thus described my invention what I claim and desire to protect by Letters Patent is:

1. The method of nodulizing paper stock which consists in beating the stock with rods in a rotating drum at a consistency of at least fifteen per cent and not more than thirty three per cent.

2. The method of treating waste paper which consists in beating the paper in a rod mill with substantially 500 gallons of water, 1 gallon of kerosene, 20 pounds of bentonite and 50 pounds of soda ash to substantially 2000 pounds of waste paper.

3. The method of treating waste paper which consists in beating the paper in a rod mill with substantially 500 gallons of water, 1 gallon of kerosene, 20 pounds of bentonite and 50 pounds of soda ash to substantially 2000 pounds of waste paper, and washing the beaten stock.

4. The method of treating waste paper containing ground wood which consists in treating the paper in a rod mill with approximately 500 gallons of water, 1 gallon of kerosene, 30 pounds of soda ash and 50 pounds of bentonite to approximately 2000 pounds of waste paper.

5. The method of treating waste paper containing ground wood which consists in treating the paper in a rod mill with approximately 500 gallons of water, 1 gallon of kerosene, 30 pounds of soda ash and 50 pounds of bentonite to approximately 2000 pounds of waste paper, and washing the beaten paper stock.

6. The method of forming an absorbent for fluids which consists in beating the stock in a rod mill at a consistency of at least fifteen per cent, and not more than thirty three per cent.

7. The method of producing paper pulp which consists in beating waste paper with de-inking reagents in a rod mill at a consistency of at least fifteen per cent and not over thirty three per cent to nodulize the paper stock, and washing the nodulized paper stock.

8. The method of treating waste paper containing ground wood which consists in treating the paper in a rod mill with approximately 500 gallons of water, 1 gallon of kerosene, 30 pounds of soda ash and 50 pounds of bentonite to approximately 2000 pounds of waste paper, the treatment being carried out at a temperature of approximately 140° F.

9. The method of treating waste paper which consists in beating the paper in a rod mill with substantially 500 gallons of water, 1 gallon of kerosene, 20 pounds of bentonite and 50 pounds of soda ash to substantially 2000 pounds of waste paper, the treatment being carried out at a temperature of approximately 140° F.

SIDNEY D. WELLS.